(12) United States Patent
Wang

(10) Patent No.: US 7,442,033 B2
(45) Date of Patent: Oct. 28, 2008

(54) INJECTION MOLD

(75) Inventor: Tzu-Tu Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/748,503

(22) Filed: May 15, 2007

(65) Prior Publication Data
US 2007/0292552 A1    Dec. 20, 2007

(30) Foreign Application Priority Data
Jun. 16, 2006   (CN) .................... 2006 1 0061185

(51) Int. Cl.
*B29B 11/06* (2006.01)
(52) U.S. Cl. .................. 425/562; 425/553; 264/161
(58) Field of Classification Search ............ 425/553, 425/562; 264/161
See application file for complete search history.

(56) References Cited

U.S. PATENT DOCUMENTS

| | | | | |
|---|---|---|---|---|
| 4,647,275 A | * | 3/1987 | Lundquist | 425/553 |
| 4,952,354 A | * | 8/1990 | Yokoi et al. | 264/69 |
| 5,098,281 A | | 3/1992 | Kitamura | |
| 5,961,901 A | | 10/1999 | Asai | |

* cited by examiner

*Primary Examiner*—Yogendra Gupta
*Assistant Examiner*—Maria Veronica D Ewald
(74) *Attorney, Agent, or Firm*—Frank R. Niranjan

(57) ABSTRACT

An exemplary injection mold includes a first mold, a second mold, and a trimming member. The first mold and the second mold cooperatively define a cavity therein, for forming a molded article. A runner is defined in the second mold and communicated with the cavity, for melted resin running therethrough. A through hole is defined in the second mold, with an end disposed at a connection between the runner and the cavity. The trimming member is slidably received in the through hole, moving between a first position to allow melted resin flowing into the cavity and a second position to prevent melted resin flowing into the cavity.

15 Claims, 4 Drawing Sheets

INJECTION MOLD

BACKGROUND OF THE INVENTION

1. Field of the Invention

The present invention relates to injection molds, and more particularly to an injection mold which can efficiently eliminate surface defects of molded products.

2. Description of Prior Art

Conventionally, molded products manufactured by injection molds have been widely used in various fields.

Injection-molded products are formed by introducing molten resin into a cavity via a single gate or multiple gates. When gates are used, end-surface positions of a molded product are set as the gate positions, and the melted resin introduced via these gate positions flow into the mold. When the molded product is configured and separated from the gate positions use a cutting member along a separating surface, risen parts or depressions are formed at the separating surface of the molded product. This will spoil the appearance and lower the precision of the dimensions of the molded product.

What is desired, therefore, is an injection mold which can efficiently eliminate the aforementioned defects of molded products.

SUMMARY OF THE INVENTION

An exemplary injection mold includes a first mold, and a second mold, and a trimming member. The first mold and the second mold cooperatively define a cavity therein, for forming a molded article. A runner is defined in the second mold and communicated with the cavity, for melted resin, or some other suitable moldable material, running therethrough. A through hole is defined in the second mold, with an end disposed at a connection between the runner and the cavity. The trimming member is slidably received in the through hole, moving between a first position to allow melted resin to flow into the cavity and a second position to prevent melted resin flowing from flowing into the cavity.

Other advantages and novel features will become more apparent from the following detailed description of a preferred embodiment when taken in conjunction with the accompanying drawings, in which:

DETAILED DESCRIPTION OF THE INVENTION

Figure 1:
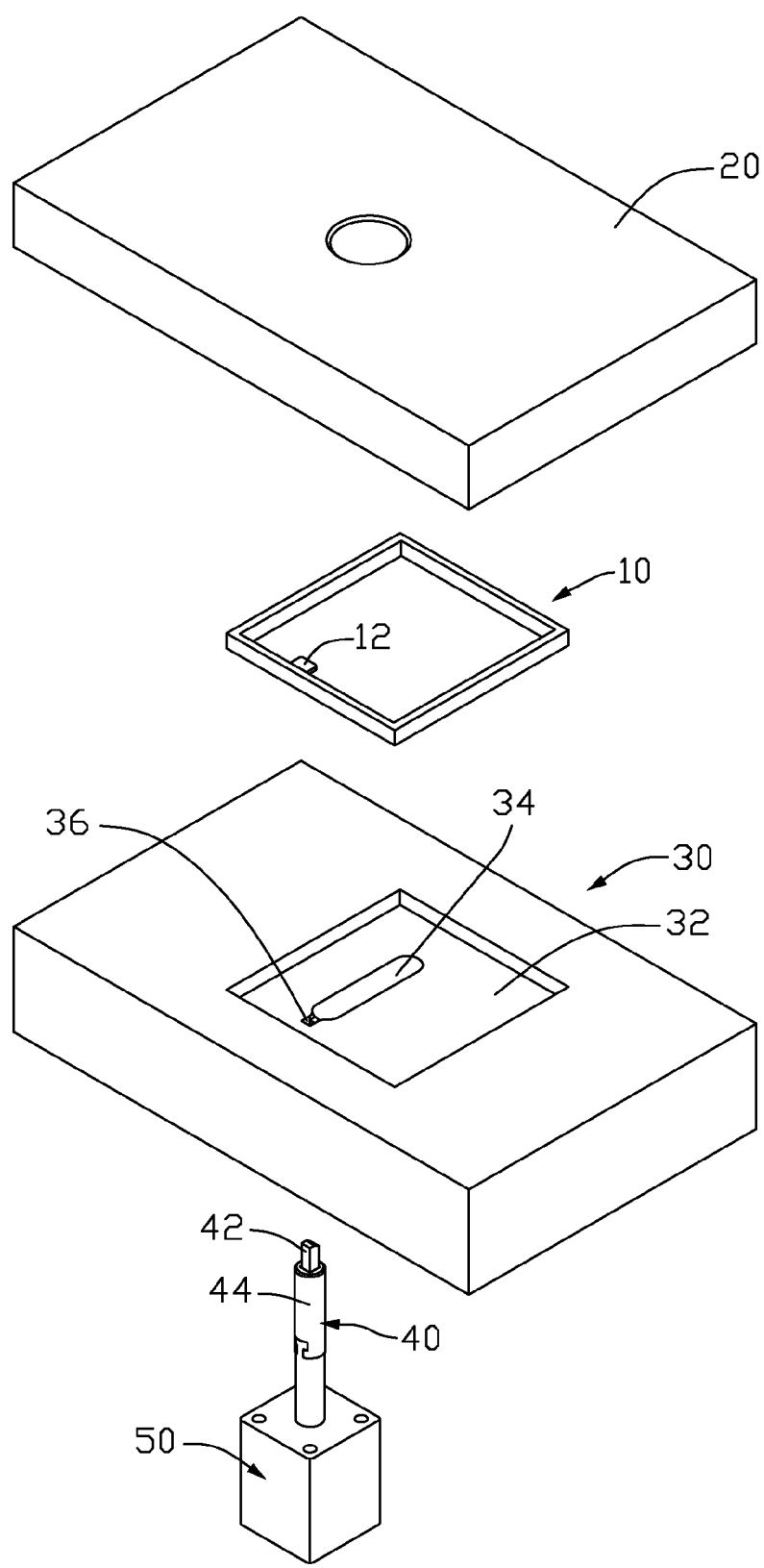
FIG. 1 is an exploded, isometric view of an injection mold in accordance with a preferred embodiment of the present invention, together with a molded article, the injection mold including a first mold, a second mold, and a trimming member.

Referring to FIG. 1, an injection mold in accordance with a preferred embodiment of the present invention includes a first mold 20, a second mold 30, and a trimming member 40 driven by a driving member 50. The first mold 20 and the second mold 30 cooperatively act for forming a molded article 10. The molded article 10 is generally a rectangular frame and includes a tab 12 extending from an inside thereof, needing to fully satisfy precise dimensional requirements.

Figure 2:
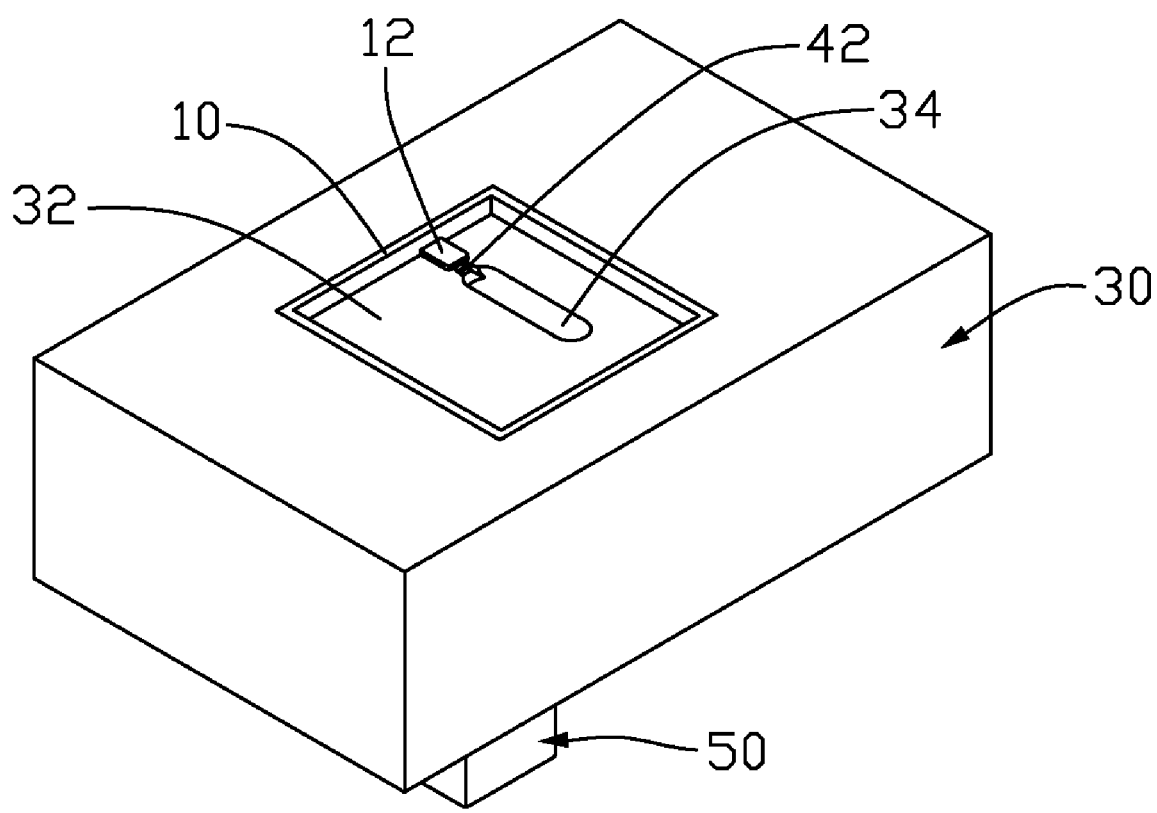
FIG. 2 is an assembled view of the second mold and the trimming member of FIG. 1.
Figure 3:
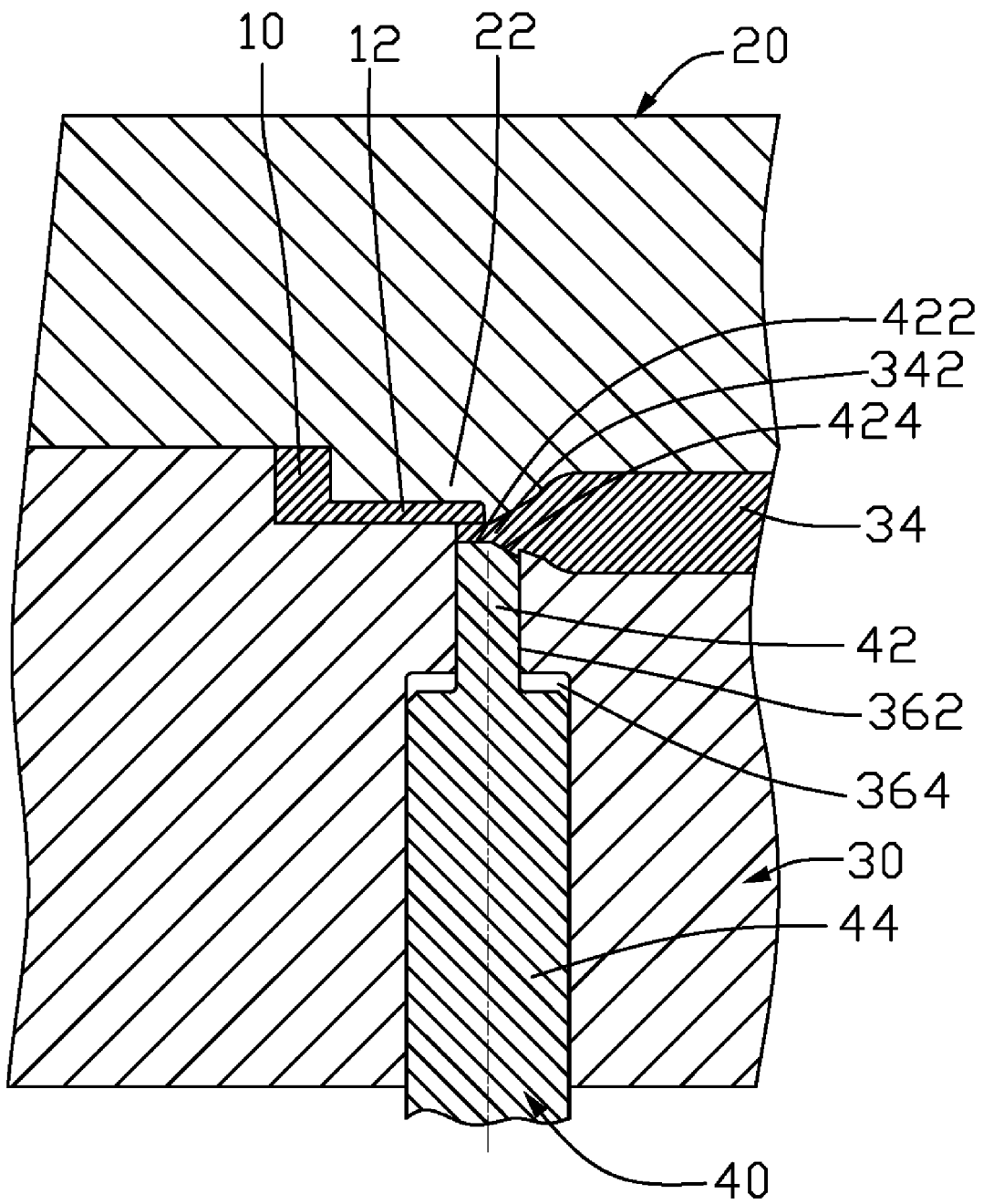
FIGS. 3 and 4 are cross-sectional views of the molded article formed in the injection mold, respectively showing the trimming member in a first position and a second position.

Referring also to FIGS. 2-3, the first mold 20 includes a protruding portion 22 extending downward therefrom. The second mold 30 includes a recessed portion 32 defined therein, corresponding to the protruding portion 22 of the first mold 20. A cavity is defined between the protruding portion 22 of the first mold 20 and the recessed portion 32 of the second mold 30, having a same shape with the molded article 10. A runner 34 is horizontally defined in the second mold 30, for melted resin running therethrough. A nozzle 342 is arranged at a distal end of the runner 34 and communicated with the cavity, for melted resin running therethrough and into the cavity. The nozzle 342 is located near a portion of the cavity where the tab 12 of the molded article 10 is formed. A through hole 36 is vertically defined in the second mold 30, with an upper end disposed at a connection between the cavity and the nozzle 342 of the runner 34. The through hole 36 is stepped and includes a rectangular portion 362 in the upper part, and a rounded portion 364 in the lower part. A size of the rectangular portion 362 is less than that of the round portion 364.

Figure 4:
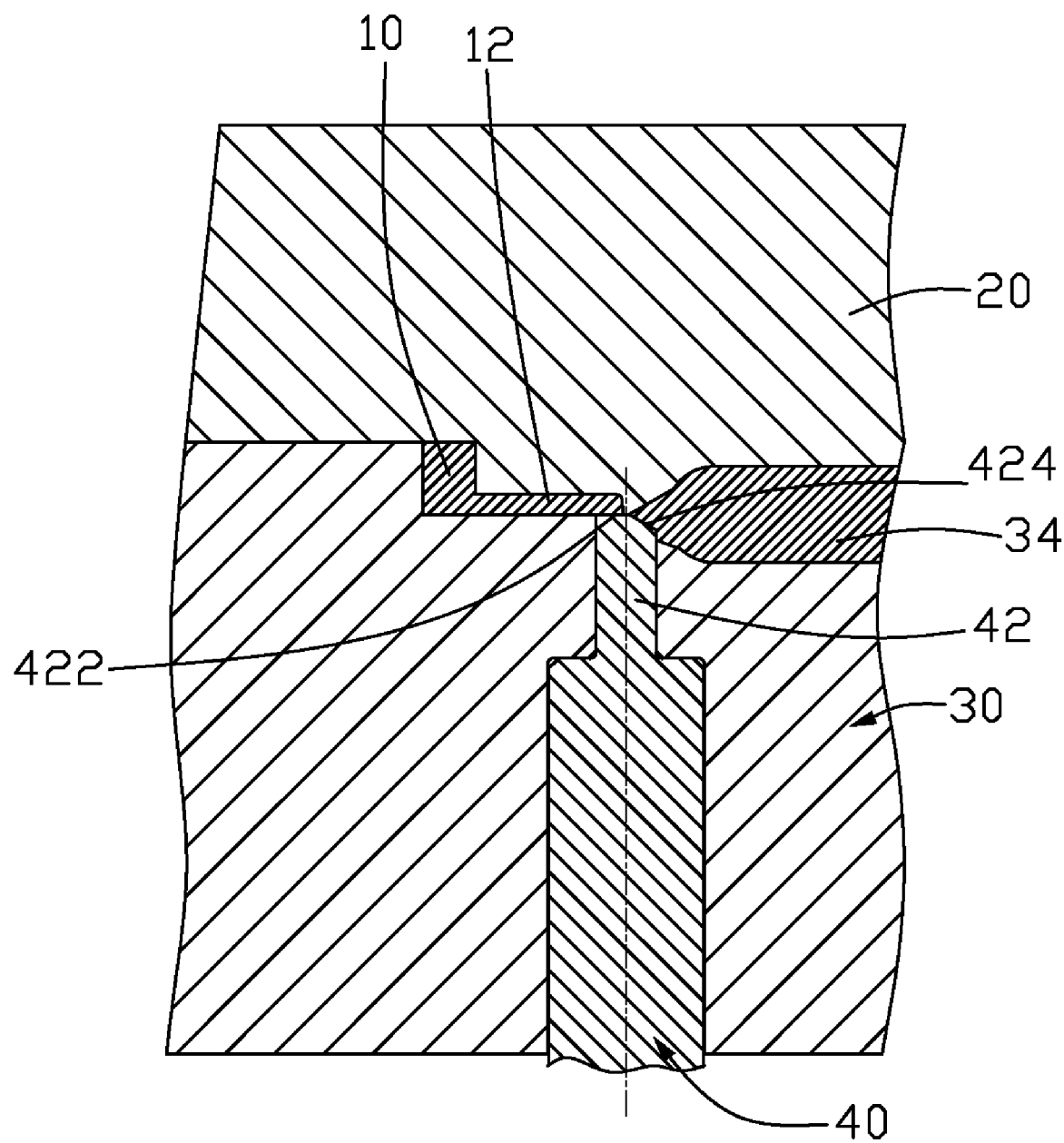

The trimming member 40 is slidably received in the through hole 36 of the second mold 30. The trimming member 40 includes a rectangular portion 42, and a rounded portion 44 extending downward from an end of the rectangular portion 42, respectively corresponding to the rectangular portion 362 and the rounded portion 364 of the through hole 36 of the second mold 30. An upper end of the rectangular portion 42 of the trimming member 40 includes a flat surface 422, and a slanted surface 424 extending from the flat surface 422. Referring also to FIGS. 3-4, the trimming member 40 is slidably received in the through hole 36 of the second mold 30, moving between a first position to allow melted resin to flow into the cavity and a second position to prevent melted resin flowing into the cavity.

When the first mold 20 and the second mold 30 are fixed together, the trimming member 40 is driven by the driving member 50 to move down to the first position at which the upper end of the trimming member 40 moves away from the cavity a distance for forming a gate therebetween. Thus, melted resins are allowed to run through the runner 34 and feed into the cavity via the nozzle 342 and the gate. The slanting surface 424 of the trimming member 40 lets melted resin easily run into the cavity.

After the cavity is filled by the melted resin, the trimming member 40 is driven by the driving member 50 to move up to the second position at which the flat surface 422 of the trimming member 40 moves gradually to contact a bottom surface of the tab 12 of the molded article 10 and the slanting surface 424 of the trimming member 40 moves gradually to block the nozzle 342 of the runner 34. That is, the gate is closed. As a result, excess resin remaining in the through hole 36 is pushed back into the runner 34 and no excess resin is allowed to remain in contact with the molded article 10. Further, the cavity is left completely full so that there is no shortage of resin forming the molded article 10 and therefore no depressions left at a portion of its surface at or around the gate. The molded article 10 can then be separated from the first and second molds 20, 30 and be of good appearance and precise dimensions. It should be noted that the gate may be located at a point in along the cavity of the molds 20, 30 corresponding to a surface of the molded article 10 that can be considered non-critical for appearance purposes.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. An injection mold comprising:
   a first mold;
   a second mold together with the first mold cooperatively defining a cavity therebetween for forming a molded article, the second mold comprising a runner defined therein for melted resin running therethrough, the runner comprising a nozzle communicating with the cavity, a through hole defined in the second mold and having an end disposed at a connection between the nozzle and the cavity; and
   a trimming member slidably received in the through hole of the second mold and being movable between a first position where the trimming member is removed from the nozzle to allow the melted resin flowing into the cavity and a second position where the trimming member closes the nozzle to prevent the melted resin flowing into the cavity,
   wherein the through hole comprises a rounded portion communicating with the nozzle of the runner, and a rectangular portion connecting with the rounded portion, the trimming member comprises a rounded portion, and a rectangular portion, corresponding to the rounded portion and the rectangular portion of the through hole of the second mold respectively.

2. The injection mold as claimed in claim 1, wherein a distal end of the rounded portion of the through hole is disposed at the connection between the cavity and the nozzle of the runner.

3. The injection mold as claimed in claim 2, wherein a distal end of the trimming member comprises a flat surface aligning with a surface of the molded article, and a slanting surface extending from the flat surface for guiding superfluous melted resin out of the nozzle when the trimming member is located at the second position.

4. The injection mold as claimed in claim 1, wherein a size of the rounded portion of the through hole is less than that of the rectangular portion.

5. The injection mold as claimed in claim 1, wherein the trimming member is driven by a driving member.

6. An injection mold comprising:
   a cavity configured for forming a molded article therein;
   a runner configured for melted resin running therethrough to the cavity, a nozzle defined at one end of the runner to communicate the runner with the cavity;
   a through hole with an end located at a junction between the nozzle of the runner and the cavity; and
   a trimming member slidably moving in the through hole and comprising a flat surface and a slanting surface extending from the flat surface formed at a distal end thereof, the trimming member moving away from the cavity for allowing melted resin flowing into the cavity via the nozzle of the runner and moving toward the cavity with the flat surface contacting with a wall of the molded article to separate the cavity from the runner after the melted resin fills up the cavity.

7. The injection mold as claimed in claim 6, comprising a first mold, and a second mold, cooperatively defining the cavity for forming the molded article.

8. The injection mold as claimed in claim 7, wherein the through hole and the runner are defined in the second mold.

9. The injection mold as claimed in claim 8, wherein the trimming member comprises a rounded portion, and a rectangular portion extending from the rounded portion, the through hole has a configuration, corresponding to the trimming member.

10. The injection mold as claimed in claim 9, wherein a size of the rounded portion of the trimming member is less than that of the rectangular portion thereof.

11. An injection mold for molding an article comprising a critical surface for appearance and a non-critical surface for appearance, the injection mold comprising:
    a first mold;
    a second mold, the second mold cooperating with the first mold to define a cavity therebetween for forming the article, a cast gate of the cavity disposed at the non-critical surface for appearance of the article, a runner defined in the second mold to communicate with the cast gate for melted resin running therethrough, and a through hole defined in the second mold communicating with the cast gate, the first mold comprising a protruding portion located beside the cavity of the second mold for forming a surface of the article adjacent the non-critical surface of the article; and
    a trimming member slidably received in the through hole of the second mold and moving between a first position to allow melted resin flowing into the cavity and a second position to close the cast gate, wherein the trimming member is capable of moving toward the cast gate until a distal end of the trimming member is blocked by the protruding portion to close the cast gate and form the non-critical surface.

12. The injection mold as claimed in claim 11, wherein the trimming member comprises a top surface for closing the cast gate, and a slanting surface neighboring the top surface for guiding superfluous melted resin out of the cast gate.

13. The injection mold as claimed in claim 12, wherein the through hole and the trimming member each are stepped, and wherein when a shoulder of the trimming member touches a shoulder of the through hole, the top surface closes the cast gate.

14. The injection mold as claimed in claim 12, wherein the top surface contacts with the first mold at the second position to thereby close the gate and separate the article formed in the cavity from melted resin remained at the runner.

15. The injection mold as claimed in claim 11, wherein one end portion of the cavity overlaps the gate in movement direction of the trimming member.

* * * * *